United States Patent Office

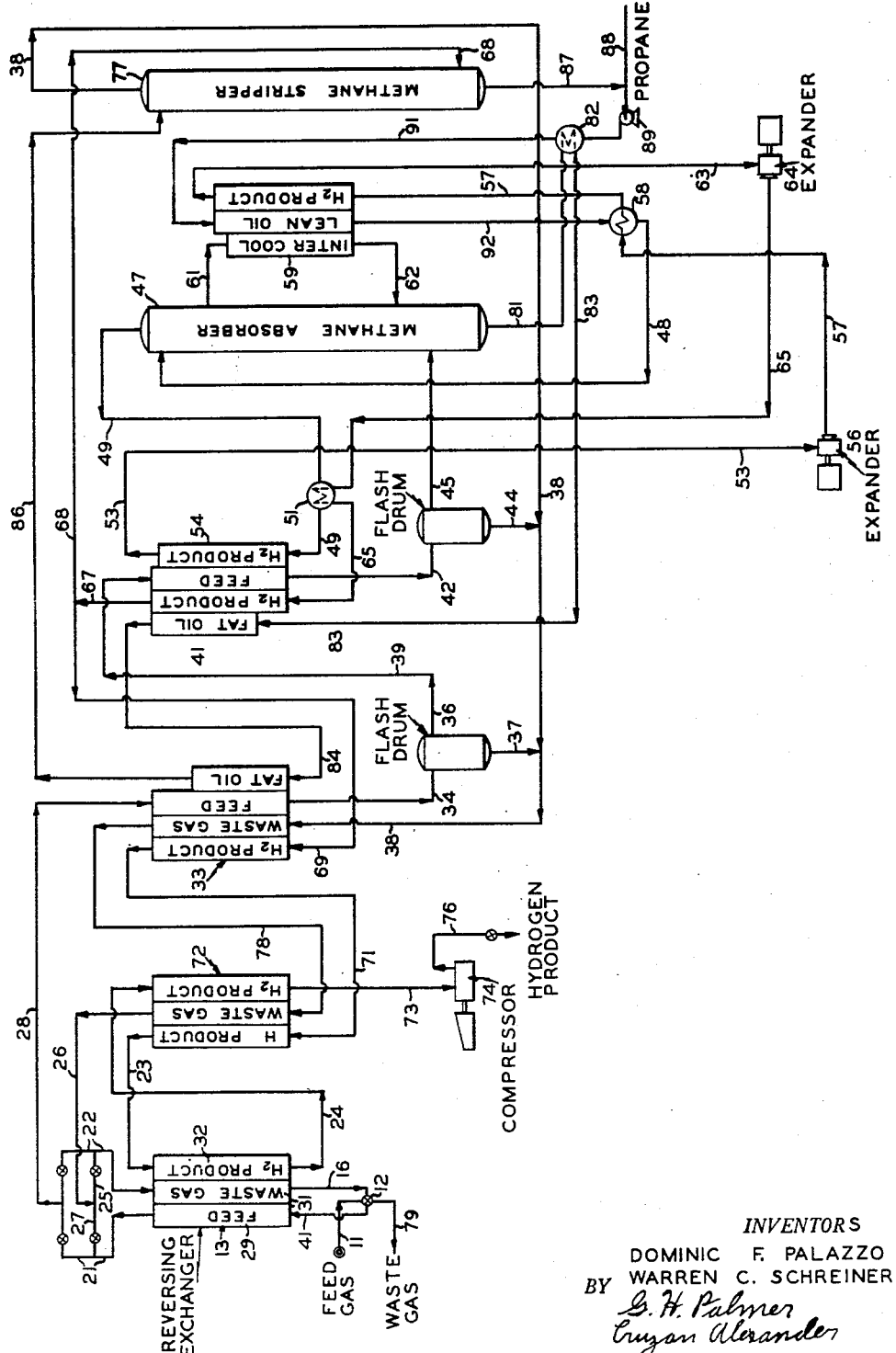

2,956,410
Patented Oct. 18, 1960

2,956,410

GAS SEPARATION

Dominic F. Palazzo, Brooklyn, and Warren C. Schreiner, Franklin Square, N.Y., assignors to The M. W. Kellogg Company, Jersey City, N.J., a corporation of Delaware Filed Oct. 5, 1956, Ser. No. 614,211

7 Claims. (Cl. 62—13)

This invention relates to the low temperature fractionation of gaseous mixtures. It also relates to low temperature processes for the separation of hydrogen from gaseous mixtures containing the same. In one aspect, this invention relates to a method for controlling temperature of a multi-stream heat exchange process.

In industry it is frequently desired to treat gaseous mixtures for liquefaction, fractionation or separation of one or more components. Such processes are frequently carried out at low temperatures. Sufficiently low temperatures for carrying out these processes may conveniently be obtained, at least in part, by precooling the feed mixture against cold product which has usually been expended to a pressure below that of the feed mixture. Cooling duty for cooling the feed can be provided by expanded product and/or auxiliary refrigeration. Frequently, it is desired to accomplish the initial precooling of the feed by contacting it with cold, expanded product in a reversing heat exchanger. Our invention is particularly useful in connection with low temperature processes for the recovery or separation of hydrogen from mixtures containing the same in which precooling of the feed is accomplished by indirect contact with cold, expanded product in a reversing heat exchange zone.

This application is a continuation-in-part of S.N. 548,631, filed November 23, 1955.

There is a growing demand in industry for large quantities of relatively pure hydrogen. Such processes as making alcohols from esters or aldehydes, amines from nitriles and cycloparaffins from aromatics, as well as reduction of ores or catalysts, synthesis of ammonia etc., all require large amounts of relatively pure hydrogen which must be obtained at the lowest possible cost. In addition, hydrogen is used in the upgrading of cycle oils by hydrogenation and under some circumstances low cost relatively pure hydrogen is preferred for use in this type of process in preference to the relatively impure hydrogen normally used.

With the advent of catalytic reforming a potentially large and cheap source of hydrogen has become available. For example, many catalytic reforming processes such as platinum reforming of naphtha produce large quantities of hydrogen-containing gases as by-products. Unfortunately, the hydrogen-containing gases produced in such processes frequently contain considerable quantities of methane and heavier hydrocarbons and some water which must be removed if reasonably pure hydrogen is to be obtained.

One method of recovering hydrogen from such mixtures of hydrogen and hydrocarbons is to lower the temperature of the mixture so that the hydrocarbons condense. The condensed hydrocarbons are then easily removed. Cooling and removing condensed hydrocarbons is effective to a certain extent; however, some methane always remains and this residual methane may be removed by further treatment such as absorption with liquefied normally gaseous hydrocarbons, e.g., propane.

It is an object of this invention to provide an improved process for the low temperature fractionation or separation of a gaseous mixture in which said mixture is cooled by at least one outflowing product stream in a reversing heat exchange system and in which means are provided for restricting the temperature difference between the gaseous mixture and the cold product stream or streams near the cold end of the reversing heat exchange zone in order to permit precipitated deposits to be removed by the product stream or streams, at at least the same rate at which they are formed.

It is another object of this invention to provide an improved process for the recovery of hydrogen from mixtures containing the same, water and hydrocarbons in which said mixture is cooled by at least one outflowing stream of expanded product in a reversing heat exchange zone and in which means are provided for restricting the temperature difference between the gaseous feed mixture and the expanded product in the cold end of the reversing heat exchange zone.

A further object of this invention is to provide an improved low temperature process for the recovery of hydrogen from mixtures containing the same, water and normally gaseous hydrocarbons.

Another object of this invention is to provide an improved process for the purification of hydrogen.

It is another object of this invention to provide an improved low temperature process for the recovery of hydrogen from hydrogen-rich refinery gas.

It is yet another object of this invention to provide an improved process for controlling the temperature of a multi stream heat exchange process.

It is a further object of this invention to provide an improved process for preventing excessive build up of solids in low temperature heat exchangers.

Other objects and advantages will become apparent to those skilled in the art without departing from the scope of our invention.

Frequently, as in the case where hydrogen is being recovered from refinery gas, a mixture from which it is desired to obtain relatively pure hydrogen comprises mostly hydrogen and normally gaseous hydrocarbons and small quantities of water and heavier hydrocarbons. Such mixtures are frequently available at relatively high temperatures and it is usually desirable to effect the condensation of the water and hydrocarbons by cooling the incoming feed in a heat exchanger or series of heat exchangers in which the cooling duty is supplied in whole or in part by cold hydrogen product and/or waste gas product. In a preferred embodiment of our invention, cold hydrogen product and cold waste gases are used to supply the cooling duty needed to condense water and hydrocarbons from the incoming feed. The waste gas comprises hydrocarbons which have been condensed and separated from the feed and may also include any portion of the hydrogen product which has been used to strip absorbed methane from the absorption medium used to remove residual methane from the hydrogen product.

In accordance with this use of our invention, feed gas entering the process is first cooled by indirect contact with expanded waste gas and hydrogen product in a reversing heat exchanger. In the use of reversing heat exchangers, at least two passageways are provided through which the feed and product streams are passed in countercurrent heat exchange, the feed and product streams being passed through the passageways alternately in time cycles. Since it is desired to obtain one of the cold streams, i.e., hydrogen product, uncontaminated by the impurities which are normally acquired by the product stream flowing through the reversing heat exchanger, the reversing heat exchanger is provided with three passageways. The feed and waste gas streams are passed in reversing heat exchange through two of the passageways, while the hydrogen stream is passed continuously through the third passageway in countercurrent heat exchange with the feed stream.

The heat exchanger is employed in the reversing arrangement described above in order to clear the equipment of materials deposited from the gas being cooled. Since the feed is cooled in this exchanger to below the freezing point of water, deposits of ice accumulate on the heat exchange surfaces and must be removed periodically to prevent plugging of the passageways through which the feed gas passes. The time cycles for the alternate flow of feed and cooling stream in the reversing heat exchanger are arranged to stop the flow of feed prior to the accumulation of deposits of ice in amounts effective to obstruct the passageways through which the feed passes. The feed stream is then diverted to the other reversing passageway of the exchanger and the cooling waste gas stream, which is at a lower pressure than the feed stream, passes through the passageway containing the accumulation of deposits to re-evaporate such deposits and thus remove them from the apparatus in the waste gas stream. The waste gas stream thus acts as both a cooling medium and a scavenging medium in that the passage of the waste gas stream at a lower pressure in reversing heat exchange with the feed stream serves both to cool the feed stream and to clear the equipment of ice deposited during the cooling of the feed stream. Meanwhile, the feed gas stream is cooled and caused to deposit additional material on the surfaces of the passageway previously traversed by the waste gas stream. Since the waste gas stream is used as the scavenging medium, it is unnecessary to remove from it the water scavenged from the apparatus.

The direction of flow in either heat exchange passageway is reversed as a result of the interchange of passageways between the reversing streams but each of the gaseous streams undergoing reversal always flows through the heat exchange zone in the same direction, first in one passageway and then in the other. In the practice of our invention, the feed stream and the waste gas stream flow in reversing countercurrent heat exchange while the hydrogen product stream flows through the third passageway in the same heat exchange zone without being reversed.

Under certain conditions the capacity of the scavenging gas for removing deposits from the heat exchange zone is insufficient to remove such deposits at the same rate per cycle at which they are deposited. Under such conditions, the amount of precipitated material in the heat exchange zone accumulates from cycle to cycle whereby periodic and undesirable shutdowns of the heat exchanger are necessary for removal of the accumulated deposits. This situation might occur for instance, when too great a temperature differential exists between the feed stream and the cooling streams. If this temperature differential is too great, the temperature difference between the relatively warm feed stream and the relatively cold scavenging stream of the heat exchange zone may be so large (the temperature of the scavenging so low) as to limit the capacity of the available scavenging gas for removing the deposits at the rate at which they are formed. This may be so where the heat capacities of the feed stream and the cooling streams are such that the temperatures of said streams converge toward the cold end of the heat exchange zone as well as when conditions are such that the temperatures diverge toward the cold end. For economical or other reasons, the heat exchange stream may be designed so as to provide for a great temperature difference at one end of the heat exchange zone and to operate with a high converged temperature difference. Under such conditions, the temperature difference at the cold end may well be excessive in spite of the fact that the temperatures are converging in that area.

The temperature differences between the warm stream and the cold scavenging stream which may be tolerated are effected somewhat by the relative quantity of scavenging gas available. When a large volume of scavenging gas is available, greater temperature differences between the warm and cold streams may be tolerated, whereas the necessity for removing accumulated deposits with a relatively small volume of scavenging gas requires that the temperature difference between the warm and cold streams be substantially restricted. The temperature differential between the warm and cold streams which may be tolerated at any point in operations in which all of an impurity which is deposited at that point by the air stream is to be evaporated by the cold scavenging stream, may be determined for design purposes in accordance with the rule that, for the impurity under consideration, the saturation capacity of the relatively cold scavenging stream passing that point shall be at least as great as the saturation capacity of the relatively warm feed stream passing that point. By saturation capacity is meant the capacity of the stream in question for containing vaporized impurity when the stream is saturated with the impurity under the prevailing operating conditions. The saturation capacity of a stream is a measure of the total amount of impurity which can be carried in the stream under given operating conditions and is, therefore, a measure of the ability of the stream to deposit or revaporize the impurity under the given operating conditions. As a factor of safety the rule may be modified to require that the saturation capacity of the scavenging stream shall be substantially greater than that of the feed stream. In the design of reversing heat exchangers a safe rule is to require that the saturation capacity of the feed stream shall not exceed the capacity of the scavenging stream at 85% saturation. A temperature differential which satisfies these conditions is permissible for the point under consideration in operations in which it is desired to effect complete re-evaporation of all of the impurity under consideration which is deposited at that point.

The removal of deposited impurity in the heat interchange zone may be maintained at a rate equal to that rate of precipitation if the ratio of the vapor pressure of the impurity at the temperature of the scavenging gas, to the vapor pressure of the impurity at the temperature of the feed being treated, is approximately equal to, or greater than, the ratio of the actual volume of the feed being treated to the actual volume of the scavenging gas.

According to one aspect of our invention, a gaseous mixture is fractionated in a low temperature expansion and fractionating system in which an inflowing feed stream of said mixture enters the system at a pre-expansion pressure through a reversing heat exchange zone in which the inflowing stream is cooled and in a cold part of which high boiling impurities are precipitated from the inflowing stream. A first outflowing product stream at a post-expansion pressure passes through the reversing heat exchange zone to absorb heat and to scavenge the precipitated high boiling impurity by revaporization at the lower post-expansion pressure. The inflowing and outflowing streams are passed countercurrently and alternately with each other through first and second periodically reversing passageways in indirect heat exchange relation in the reversing heat exchange zone. A second outflowing product stream continually flows through a third passageway in the reversing heat exchange zone in indirect heat exchange relation with and countercurrently to the inflowing feed stream. In order to prevent an excessive accumulation of precipitated impurity in the cold part of the first and second passageways of the reversing heat exchange zone, at least one of the outflowing streams, prior to its passage through the reversing heat exchange zone, is passed in indirect heat exchange relation with at least one of the outflowing streams subsequent to the passage of said outflowing stream through the reversing heat exchange zone.

In a preferred embodiment, our invention is used in connection with the recovery of hydrogen from a feed gas such as refinery gas or product gas from a hydroforming operation which is composed primarily of hydrogen and normally gaseous hydrocarbons with small amounts of heavier hydrocarbons and water. In this embodiment of our invention, the relatively warm feed gas is first cooled by indirect contact with relatively cold expanded hydrogen product and waste gas in a reversing heat exchanger of the type described above. The warm feed gas and the cold, expanded waste gas product flow in reversing heat exchange relation in the first two passageways of the reversing heat exchange zone while the cold hydrogen product flows continuously through the third passageway. The temperature of the waste gas stream approaching the reversing heat exchanger is sufficiently low so that if it were allowed to flow promptly into the reversing heat exchange zone, the temperature differential between the feed stream and the waste gas stream would be so great that deposits of ice formed by condensation of water from the feed gas could not be removed at the same rate at which they were formed. In order to avoid plugging of the reversing heat exchange passages with ice due to this excessive temperature difference, the waste gas and hydrogen product streams are warmed before passing into the reversing heat exchanger. This is accomplished by first passing them in indirect countercurrent heat exchange with warmed hydrogen product which has already passed through the third passage of the reversing heat exchanger. In this way the hydrogen product stream is cooled slightly just prior to being removed from the system and the cooling streams of waste gas and hydrogen product are warmed so that they enter the reversing heat exchanger at temperatures sufficiently high so that the waste gas stream can remove the ice deposits in the reversing heat exchange passageways at the same rate at which they are formed.

The temperature difference between the feed stream and the product and waste gas streams in the cold end of the reversing heat exchange zone is usually less than about 25° F. and preferably less than about 15° F. when our invention is practiced as described above. In this application of our invention, the temperature of the feed gas stream entering the reversing heat exchange zone is usually about 100 to about 150° F. while the temperature of the hydrogen product and waste gas streams entering the cold end of the reversing heat exchange zone is usually between about −60 and about −105° F. The temperature of the cooled feed gas leaving the cold end of the reversing heat exchange zone is between about −50 and about −100° F. while the temperature of the warmed waste gas and hydrogen product streams leaving the warm end of the reversing heat exchange zone is preferably about between 90 and about 140° F. The temperature of the cold waste gas and hydrogen product streams prior to their being warmed by heat exchange with hydrogen product from the warm end of the reversing heat exchange zone, in accordance with our invention is between about −70 and about −120° F. The actual temperatures will, however, depend on the composition of the feed gas and the pressure employed so the temperatures may vary from the above without departing from the scope of this invention.

Our invention is particularly useful in processes in which the temperature difference between the inflowing feed stream and the outflowing product streams in the reversing heat exchange zone remains substantially constant throughout the reversing heat exchange zone or in which the temperature difference decreases from the warm to the cold end of the zone. Our invention may also be used in some situations in which this temperature difference increases from the warm to the cold ends of the reversing heat exchange zones but care should be used in such cases to insure that a sufficient temperature difference is maintained at the warm end of the zone to accomplish the required amount of heat exchange. If the increase in temperature difference from the warm to the cold end of the reversing heat exchange zone is too excessive, it may be necessary to resort to other methods to restrict the temperature difference at the cold end sufficiently while still maintaining a large enough temperature difference at the warm end of the exchanger. For instance, a portion of a cooling stream passing through the reversing heat exchange zone may be withdrawn after the cooling stream has passed through that portion of the heat exchange zone, usually the cold end, where the excessive temperature differences exist and the withdrawn portion of cooling stream may then be recombined with the cooling stream prior to the point where the cooling stream enters the reversing heat exchange zone. This or other methods adapted to restrict the temperature difference at the cold end of the reversing heat exchange zone may be used in conjunction with our invention, if desired.

The preferred embodiment of our invention, described above, may be practiced with the feed gas entering the system at any superatmospheric pressure and the product gas or gases which may be used to revaporize deposited impurities may be at any pressure sufficiently low to accomplish this purpose at the temperatures used. Preferably the feed gas is obtained at a pressure between about 100 and about 500 p.s.i.g., while the expanded product gas used to revaporize the precipitated impurity is preferably used for such purposes at a pressure of at least about 100 p.s.i.g. below the pressure of the feed gas. Any product stream which is not used to revaporize deposited impurities may be withdrawn at any suitable pressure; however, it is usually desired to utilize expanded product streams to provide cooling duty and for this reason, even product streams which are not used to revaporize deposited impurities in the reversing heat exchange zone are frequently recovered at pressures 100 p.s.i.g. or more lower than the pressure of the feed stream. Usually superatmospheric pressures are maintained in order to avoid the disadvantages of operating under conditons of subatmospheric pressure for the expanded gases. The actual pressures used will, of course, depend on various factors such as the composition of the different streams and the temperatures used and hence may vary considerably from the preferred pressures given above without departing from the scope of our invention.

After the feed gas passes from the reversing heat exchanger, it is passed to another heat exchanger wherein it is cooled sufficiently to condense most of the $C_2$ and heavier hydrocarbons. Part or all of the cooling duty necessary to accomplish this may be obtained by passing the feed in countercurrent heat exchange with cold waste gas and hydrogen product streams. Part or all may also be supplied by the absorption medium which has been used to absorb methane from the hydrogen-methane mixture.

The $C_2$ and heavier hydrocarbons which are condensed in this heat exchange zone are separated from the feed stream by any suitable separation means such as a separation drum and are withdrawn and combined with the waste gas stream.

The feed stream is then passed to another heat exchange zone where it is cooled sufficiently to condense the remaining $C_2$ and heavier hydrocarbons and also as much methane as possible. The hydrocarbons condensed in this heat exchange zone are withdrawn and combined with the waste gas stream and the remaining feed material comprising mostly hydrogen contaminated with some methane is passed to an absorption zone where residual methane is absorbed by an absorption medium. Cooling duty for this heat exchange zone is supplied by cold hydrogen product. Part of the cooling duty may be supplied by the cold absorption medium containing absorbed methane. If desired, the entire cooling of the feed may take place in the reversing heat exchange zone without departing from the scope of our invention. In such a case, the condensed hydrocarbons could be separated and the hydrogen contaminated with methane could be passed directly to the absorption zone for absorption of the residual methane.

It frequently happens that it is desired to cool the feed stream to a temperature substantially equal to or slightly below that of the cold hydrogen product withdrawn from the absorption zone. In such cases, hydrogen product which has been withdrawn from the absorption zone can be cooled and then passed in indirect heat exchange with the feed stream. The hydrogen product which has passed through the heat exchange zone may then be expanded to cool it to a suitable temperature and again passes in indirect heat exchange with the feed stream. Prior to being passed in indirect heat exchange with the feed stream for the second time, the expanded hydrogen product may be used to cool the hydrogen product stream withdrawn from the absorption zone before this latter hydrogen product stream is passed in indirect heat exchange with the feed stream the first time. In this way it is possible to cool the feed stream to a temperature substantially equal to or below that of the hydrogen product stream leaving the absorption zone by passing the feed stream in indirect heat exchange with two separate streams of hydrogen product, one of said streams being the hydrogen product stream which has been withdrawn from the absorption zone and cooled by heat exchange with expanded hydrogen product and the other of said streams being expanded hydrogen product which is first used to cool the first of said streams of hydrogen product.

After the $C_2$ and heavier hydrocarbons and most of the methane has been removed, the remainder of the feed, which now comprises hydrogen contaminated with a small amount of methane, passes to an absorption zone where an absorption medium such as propane is used to absorb methane from the hydrogen. Any suitable apparatus may be used for this purpose but countercurrent contact in an absorption tower is usually preferred. The absorption medium containing absorbed methane is withdrawn from the absorption zone and passed to a stripping zone for removal of absorbed methane. The feed entering the absorption zone usually comprises hydrogen and about 2 to 10 mol percent methane. In the absorption zone sufficient methane is usually removed so that the hydrogen product contains about 90 to 100 mol percent, more usually at least 95 percent, hydrogen. The hydrogen product from the absorption zone is used to cool the feed stream as previously discussed. It may also be desirable to utilize the hydrogen product to cool the absorption medium prior to its use in the absorption zone. One way of accomplishing this is to contact the absorption medium with hydrogen product which has been expanded to lower its temperature. In this way, the absorption medium may be reduced to substantially the same or a lower temperature than the temperature of the hydrogen product leaving the absorption zone. The hydrogen product which is used for this purpose may be hydrogen product which has already been used to supply some cooling in the heat exchange zone in which most of the methane is condensed from the feed stream. In this case, the hydrogen product exiting from that heat exchange zone is expanded and then passed in indirect heat exchange relationship with the absorption medium in order to cool said hydrocarbon sufficiently for use in the absorption zone. The hydrogen product must then be further expanded in order to lower its temperature sufficiently so that it may be used to cool hydrogen product coming from the absorption zone and further used to cool the feed stream as previously described.

The absorption medium containing absorbed methane is warmed by indirect heat exchange with absorption medium coming from the stripping zone or by indirect heat exchange with the feed stream or both and then passes to the stripping zone where a portion of the hydrogen product is used to remove the absorbed methane. The hydrogen product used in the stripping zone is preferably withdrawn from the remainder of the hydrogen product after the hydrogen product stream is passed through the heat exchange zone in which most of the methane is condensed from the feed. This is done in order to secure hydrogen having the proper temperature for use in the stripping zone since, as previously discussed, it is desirable to operate the stripping zone at a somewhat higher temperature than the absorption zone. That portion of the hydrogen product which is used to strip methane from the absorption medium becomes the waste gas stream when it leaves the stripping zone and together with the methane and heavier hydrocarbons which have been condensed and separated from the feed stream as previously discussed, comprises the waste gas stream which is used to supply cooling duty in the previously discussed heat exchange zones. The remainder of the hydrogen product is used to supply cooling duty in the various heat exchange zones as previously discussed before being recovered from the system. The absorption medium leaving the stripping zone is relatively free from methane and, after cooling to a suitable temperature by indirect heat exchange with hydrogen product and/or the colder absorption medium may be returned to the absorption zone for further use in absorbing methane.

For a better understanding of our invention, reference should be had to the accompanying drawing which is a diagrammatic illustration in elevation of a suitable arrangement of apparatus for carrying out a preferred embodiment of our invention.

In the drawing, 10,040 pounds per hour of naphtha reformer gas having the composition shown in Table I enter as feed through a conduit 11 at a pressure of 135 p.s.i.a., and a temperature of 100° F.

TABLE I

*Composition of feed gas*

| | Mol percent |
|---|---|
| $H_2$ | 83.60 |
| $CH_4$ | 6.33 |
| $C_2$ hydrocarbons | 4.69 |
| $C_3$ hydrocarbons | 4.15 |
| $C_4$ and heavier hydrocarbons | 0.48 |
| $H_2S$ | 0.05 |
| $H_2O$ | 0.70 |
| | 100.00 |

The feed passes through valve 12 into a reversing heat exchanger 13 through a conduit 14. In exchanger 13 feed passing through passageway 29 is cooled to a temperature of −55° F., by indirect countercurrent heat exchange with waste gas passing through a passageway 31 and hydrogen product passing through a passageway 32. The feed stream enters exchanger 13 through valve 12 and conduit 14 and leaves through conduits 21 and 28. The waste gas stream obtained as explained below, enters exchanger 13 through conduit 26, conduit 25 and conduit 22 and leaves through conduit 16 and valve 12 and the hydrogen product enters exchanger 13 through conduit 23 and leaves through conduit 24. Valve 12 is designed so that the feed stream from conduit 11 may be passed to either conduit 14 and passageway 29 or conduit 16 and passageway 31 while the waste gas stream is always passed to conduit 79 regardless of whether it has passed through passageway 29 and conduit 14 or passageway 31 and conduit 16. The feed and waste gas streams are not allowed to mix at any time.

Due to the cooling effect of the hydrogen product and waste gas streams, the water which is contained in the feed is deposited in passageway 29 as ice. Before these deposits of ice build up sufficiently to interfere with the proper operation of the heat exchanger, the paths of the feed and waste gas are reversed so that the waste gas passes through passageway 29 and the feed passes through passageway 31. This reversal is accomplished by passing the feed stream from valve 12 through conduit 16 to passageway 31 and allowing it to leave exchanger 13 through conduits 22 and 28. At the same time, the waste gas passes through conduit 26, conduit 27, and conduit 21 to passageway 29 and then leaves the exchanger through conduit 14. During this period of reversed flow the ice previously deposited in passageway 29 is evaporated by the waste gas now flowing through passageway 29, while at the same time new deposits of ice are being formed by the passage of the feed stream through passageway 31. In this way, by periodically reversing the flow of the feed and waste gas streams, deposits of ice sufficiently large to interfere with the proper operation of the heat exchanger are prevented.

After the feed stream is cooled and contained water is removed in exchanger 13, the feed stream passes through conduit 28 to a heat exchanger 33. In exchanger 33 the feed is cooled to a temperature of −200° F., by indirect countercurrent heat exchange with cold hydrogen product and waste gas streams. Part of the cooling duty in the cold end of exchanger 33 is also supplied by propane which has been used to absorb residual methane from the hydrogen product. From exchanger 33 the feed passes through conduit 34 to a separator drum 36 in which the hydrocarbons condensed by the cooling of the feed in exchanger 33 are separated. The separated hydrocarbons, having the composition shown in Table II, are withdrawn from separator drum 36 through conduit 37 and are combined with the waste gas stream in conduit 38.

TABLE II

*Composition of waste stream from separator drum 36*

| | Mol percent |
|---|---|
| $H_2$ | 0.34 |
| $CH_4$ | 5.90 |
| $C_2H_2$ | 44.52 |
| $C_3H_8$ | 43.62 |
| $C_4H_{10}$ and heavier | 5.08 |
| $H_2S$ | 0.54 |
| | 100.00 |

Separator drum 36 is operated at a temperature of −200° F. and a pressure of 132 p.s.i.a.

From separator drum 36 the feed passes through conduit 39 to a heat exchanger 41. In exchanger 41 the feed is further cooled by indirect countercurrent heat exchange with hydrogen product streams. Additional cooling is attained in the warm end of exchanger 41 by the use of propane which has been used to absorb residual methane from the hydrogen product. In exchanger 41 the feed is cooled to a temperature of −290° F., thereby condensing all the $C_2$ and heavier hydrocarbons and also a considerable amount of methane. The feed stream passes from exchanger 41 through conduit 42 to a separator drum 43 wherein the condensed hydrocarbons are separated. The hydrocarbons separated in separator drum 43 have a composition as shown in Table III and are withdrawn through conduit 44 and combined with the waste gas stream in conduit 38.

TABLE III

*Composition of waste stream from separator drum 43*

| | Mol percent |
|---|---|
| $H_2$ | 0.25 |
| $CH_4$ | 69.82 |
| $C_2H_6$ | 29.12 |
| $C_3H_8$ | 0.81 |
| | 100.00 |

Drum 43 is operated at a pressure of 131 p.s.i.a. and a temperature of −290° F.

Following removal of the condensed hydrocarbons the feed stream, which now comprises 94.7 mol percent hydrogen product and 5.3 mol percent residual methane, passes through conduit 45 to an absorption tower 47. In absorption tower 47 the feed introduced through conduit 45 is countercurrently contacted with liquid propane introduced through conduit 48. Substantially all of the residual methane is absorbed by the liquid propane and 2,668 pounds per hour of hydrogen product comprising 99.95 mol percent hydrogen and 0.05 mol percent methane are withdrawn from absorption tower 47 through conduit 49. Absorption tower 47 is operated at a pressure of 130 p.s.i.a. with a bottom temperature of −272° F. and a top temperature of −289° F.

Hydrogen product in conduit 49 passes to a heat exchanger 51 where it is cooled to a temperature of −295° F. by indirect contact with expanded hydrogen product and then passes through conduit 49 to heat exchanger 41 where it passes through passageway 54 and supplies cooling duty to the cold end of exchanger 41. From passageway 54 the hydrogen product passes through conduit 53 at a temperature of −280° F., to expander 56. In expander 56 the hydrogen product is expanded to a pressure of 62 p.s.i.a. and its temperature is lowered thereby to −312° F.

Expanded hydrogen product passes through expander 56 through conduit 57 to heat exchanger 58 where it is used to indirectly cool propane to a suitable temperature for use in absorption tower 47. From exchanger 58 the hydrogen product continues through conduit 57 at a temperature of −295° F., and enters heat exchanger 59. In exchanger 59 the hydrogen product is passed in indirect countercurrent heat exchange with warmer propane whereby the propane is cooled. In addition, material from absorption tower 47 is withdrawn through conduit 61 at a temperature of −275° F., and is passed through a separate passageway in the cold end of exchanger 59 whereby its temperature is lowered to −281° F., by indirect countercurrent heat exchange with the hydrogen product. This material is then returned to absorption tower 47 through conduit 62. By withdrawing material from absorption tower 47, cooling it in exchanger 59 and then returning it to the absorption tower, it is possible to decrease the overall temperature rise in the absorption tower. This decreases the flow rate of propane required which in turn decreases the amount of the hydrogen product which must be used to strip absorbed methane from the propane. Since as explained below, the hydrogen product which is used to strip the propane is subsequently discarded as waste gas, this intercooling of the material in absorption tower 47 results in a greater yield of hydrogen product.

Hydrogen product leaves exchanger 59 through conduit 63 at a temperature of −268° F. and passes to expander 64 in which it is expanded to a pressure of 27 p.s.i.a. with a corresponding temperature drop to −306° F. From expander 64 the hydrogen product passes through conduit 65 to heat exchanger 51 where it is indirectly contacted with the hydrogen product in conduit 49. In this way the hydrogen product in conduit 49 is cooled to a sufficiently low temperature so that it may be utilized in the cold end of exchanger 41 to cool the feed stream to a temperature below the temperature at which the hydrogen product is withdrawn from absorption tower 47. From exchanger 51 the hydrogen product in conduit 65 continues at a temperature of −300° F., to exchanger 41 where it is again used to cool the feed stream. By expanding the hydrogen product following its first use in exchanger 41 and then using the expanded hydrogen to supply further cooling duty in exchanger 41, it is possible to cool the feed to a much lower temperature than would otherwise be possible. Furthermore, by using the expanded hydrogen in conduit 65 to cool the hydrogen in conduit 49, before the hydrogen in conduit 49 enters exchanger 41, it is possible to use the hydrogen in conduit 49 to cool the feed to a lower temperature than the temperature at which the hydrogen product is withdrawn from the absorption zone. At the same time, the hydrogen in conduit 65 remains sufficiently cold so that it may be used for the same purpose.

The hydrogen product which enters exchanger 41 through conduit 65, is withdrawn through conduit 67. Part of this product is diverted through conduit 68 at the rate of 459 pounds per hour to be used in stripping absorbed methane from the propane. The remainder of the hydrogen product from conduit 67 passes through conduit 69 at a temperature of —223° F., and a pressure of 26.8 p.s.i.a. to exchanger 33.

In exchanger 33 the cold hydrogen product is passed in indirect countercurrent heat exchange with the feed stream as a result of which its temperature is raised to —86° F. From exchanger 33 this hydrogen product stream passes through conduit 71 to heat exchanger 72. In exchanger 72 the cold hydrogen product stream and the cold waste gas stream are both warmed by indirect countercurrent heat exchange with warm hydrogen product. The hydrogen product stream which entered exchanger 72 through conduit 71 leaves exchanger 72 at a temperature of —63° F. and passes through conduit 23 to passageway 32 in heat exchanger 13. In exchanger 13 the hydrogen product is contacted in indirect countercurrent heat exchange with the incoming feed stream. The hydrogen product passes through passageway 32 continuously while the feed and waste gas streams alternate between passageways 29 and 31 as previously explained. The hydrogen product passes from passageway 32 through conduit 24 at a temperature of 92° F., to heat exchanger 72 where it is passed in indirect countercurrent heat exchange with cold hydrogen product and waste gas streams as previously discussed. From exchanger 72, the hydrogen product passes through conduit 73 at a temperature of 56° F. and a pressure of 20.0 p.s.i.a. to compressor 74 in which it is compressed to a pressure of 135 p.s.i.a. The hydrogen product is then recovered from the system at the rate of 2,209 pounds per hour through conduit 76 at a temperature of 100° F. as the product of the process. The hydrogen product may, of course, be recovered without compression, if desired, without departing from the scope of our invention.

That portion of the hydrogen product which is diverted through conduit 68 to be used to strip absorbed methane from the propane passes through conduit 68 to the lower portion of a stripping tower 77. In stripping tower 77 the hydrogen passes in countercurrent contact with the propane and thereby absorbs methane from the propane. The hydrogen-methane mixture is then withdrawn from the upper portion of stripping tower 77 as waste gas at the rate of 1,629 pounds per hour through conduit 38. The waste gas in conduit 38 is combined with condensed hydrocarbons from conduits 44 and 37 and combined waste gas stream passes from conduit 38 to heat exchanger 33. In exchanger 33 the waste gas stream is passed in indirect countercurrent heat exchange with the feed stream and then passes through conduit 78 at a temperature of —86° F., to heat exchanger 72 where it is warmed to a temperature of —63° F., by indirect countercurrent heat exchange with warm hydrogen product. Exchanger 72 is utilized to warm the cold waste gas and hydrogen product streams in order to reduce the temperature difference experienced in exchanger 13. If the cold waste gas were allowed to enter exchanger 13 without being first warmed in exchanger 72, the result would be that the waste gas stream would not be able to remove the ice deposits in the reversing passageways of exchanger 13 as rapidly as they were formed. By the use of exchanger 72 it is possible to maintain the temperature difference in exchanger 13 sufficiently low and at the same time maintain the temperature of the waste gas in exchanger 13 sufficiently high so that efficient removal of the ice deposits may be accomplished. From exchanger 72, the waste gas stream passes through conduit 26 and conduit 22 to passageway 31 of heat exchanger 13. From exchanger 13, the waste gas passes through conduit 16 and valve 12 and is withdrawn from the system through conduit 79 at the rate of 7,831 pounds per hour at a temperature of 92° F., and a pressure of 18.5 p.s.i.a. The waste gas withdrawn from the system has the composition shown in Table IV.

TABLE IV

*Composition of waste gas*

| | Mol percent |
|---|---|
| $H_2$ | 46.7 |
| $CH_4$ | 20.5 |
| $C_2$ hydrocarbons | 15.3 |
| $C_3$ hydrocarbons | 13.5 |
| $C_4$ and heavier hydrocarbons | 1.5 |
| $H_2S$ | 0.2 |
| $H_2O$ | 2.3 |
| | 100.0 |

When exchanger 13 is reversed, the waste gas instead of flowing through passageway 31 goes through conduits 26, 27 and 21 to passageway 29 and is withdrawn through conduit 14. In either case, the waste gas, by passing through the passageway of exchanger 13 which was used in the previous cycle to cool the incoming feed, is able to remove the deposits of ice formed during the cooling of the feed stream and the water thus formed is removed with the waste gas, as shown in Table IV. Exchangers 33 and 41 can, of course, be omitted from the system shown without departing from the scope of our invention. Their use is preferred, however, because it reduces the amount of heat exchange duty to be performed by exchanger 32.

The propane which was used to absorb methane from the hydrogen in absorption tower 47 is withdrawn from the lower portion of absorption tower 47 through conduit 81 and passes to a heat exchanger 82 where it is indirectly contacted with warmer propane thereby raising its temperature to —250° F. From exchanger 82 the propane containing absorbed methane passes through conduit 83 to exchanger 41 where its temperature is further raised by indirect countercurrent contact with the feed stream. From exchanger 41 the propane passes through conduit 84 to exchanger 33 where it is further warmed by indirect countercurrent heat exchange with the feed stream. From exchanger 33 the propane passes through conduit 86 at a temperature of —207° F., to the upper portion of stripping tower 77. In stripping tower 77 methane is removed from the propane by countercurrent contact with a portion of hydrogen product. Stripping tower 77 is operated at a pressure at 23 p.s.i.a. with a bottoms temperature of —238° F. and a temperature in its upper portion of —228° F. From the bottom of stripping tower 77, 15,200 pounds per hour of propane which is relatively free of methane is withdrawn through conduit 87. Make-up propane can be added through conduit 88 if needed. The propane in conduit 87 passes to heat exchanger 82 by means of pump 89. In exchanger 82, the propane from conduit 87 is cooled to a temperature of —263° F., by indirect heat exchange with propane containing absorbed methane and is then passed through conduit 91 to exchanger 59. In exchanger 59, the propane is further cooled to a temperature of —281° F., and then passes through conduit 92 to exchanger 58. In exchanger 58, the propane is cooled to a temperature of —298° F., by indirect contact with cold expanded hydrogen product and is then passed through conduit 48 to the upper part of absorption tower 47 where it is again used to absorb methane from the hydrogen product.

Numerous modifications and alterations may, of course, be made in the process described above without departing from the scope of our invention. Other embodiments, which will become apparent from the above description, are also intended to be within the scope of our invention.

We claim:

1. In a process for indirect heat exchanging gases in three parallel passageways of a reversing heat exchange zone, wherein an inflowing gaseous feed stream containing solidifiable impurities enters at a pre-expansion pressure through a reversing heat exchange zone in which said inflowing feed stream is cooled and in a cold part of which high boiling impurities are precipitated from said inflowing gaseous feed stream, a first outflowing gaseous product stream at a post-expansion pressure passes through said reversing heat exchange zone to absorb heat and scavenge said precipitated high boiling impurity by revaporization, said inflowing gaseous feed stream and first outflowing gaseous product stream being passed countercurrently and alternately with each other through first and second periodically reversing passageways in indirect heat exchange relation in said reversing heat exchange zone, and wherein a second outflowing gaseous product stream continuously flows through a third passageway in said reversing heat exchange zone in indirect heat exchange relation with and countercurrently to said inflowing stream, the method for preventing an excessive accumulation of said precipitated impurity in the cold part of said first and second passageways of said reversing heat exchange zone which comprises passing at least one of said outflowing gaseous product streams leaving said reversing heat exchange zone through a second heat exchange zone in heat exchange relation with the first outflowing gaseous product stream and the second outflowing gaseous product stream that are passing to the reversing heat exchange zone.

2. In a process for the indirect heat exchange of gases in three parallel passageways of a reversing heat exchange zone wherein an inflowing gaseous feed stream containing solidifiable impurities enters at a pre-expansion pressure through a reversing heat exchange zone in which said inflowing feed stream is cooled and in a cold part of which high boiling impurities are precipitated from said inflowing feed stream, a first outflowing gaseous product stream at a post-expansion pressure passes through said reversing heat exchange zone to absorb heat and scavenge said precipitated high boiling impurity by revaporization, said inflowing feed stream and first outflowing product stream being passed countercurrently and alternately with each other through first and second periodically reversing passageways in indirect heat exchange relation in said reversing heat exchange zone, and wherein a second outflowing gaseous product stream continuously flows through a third passageway in said reversing heat exchange zone in indirect heat exchange relation with and countercurrently to said inflowing feed stream, the method for preventing an excessive accumulation of said precipitated impurity in the cold part of said first and second passageways of said reversing heat exchange zone which comprises passing said second outflowing gaseous product stream leaving said reversing heat exchange zone through a second heat exchange zone in heat exchange relation with the first outflowing gaseous product stream and the second outflowing gaseous stream that are passing to the reversing heat exchange zone.

3. In a process for the indirect heat exchange of gases in three parallel passageways of a reversing heat exchange zone wherein an inflowing gaseous feed stream containing solidifiable impurities enters at a pre-expansion pressure through a reversing heat exchange zone in which said inflowing feed stream is cooled and in a cold part of which high boiling impurities are precipitated from said inflowing feed stream, a first outflowing gaseous product stream at a post-expansion pressure passes through said reversing heat exchange zone to absorb heat and scavenge said precipitated high boiling impurity by revaporization, said inflowing feed stream and outflowing product stream being passed countercurrently and alternately with each other through first and second periodically reversing passageways in indirect exchange relation in said reversing heat exchange zone, and wherein a second outflowing gaseous product stream continuously flows through a third passageway in said reversing heat exchange zone in indirect heat exchange relation with and countercurrently to said inflowing feed stream, the method for preventing an excessive accumulation of said precipitated impurity in the cold part of said first and second passageways of said reversing heat exchange zone which comprises passing said second outflowing gaseous product stream leaving said reversing heat exchange zone through a second heat exchange zone in heat exchange relation with the first outflowing gaseous product stream and the second outflowing gaseous stream that are passing to the reversing heat exchange zone.

4. In a process for recovering hydrogen from a gaseous mixture containing the same, water and hydrocarbons in a low temperature expansion and fractionating system in which an inflowing feed stream of said gaseous mixture enters said system at a pre-expansion pressure through a reversing heat exchange zone in which said inflowing feed stream is cooled and in a cold part of which water is precipitated from said inflowing feed stream to form ice, a first outflowing waste gas product stream at a post-expansion pressure passes through said reversing heat exchange zone to absorb heat and scavenge said ice by revaporization, said inflowing feed stream and outflowing waste gas stream being passed countercurrently and alternately with each other through first and second periodically reversing passageways in indirect exchange relation in said reversing heat exchange zone, and wherein a second outflowing gaseous product stream comprising hydrogen continuously flows through a third passageway in said reversing heat exchange zone in indirect heat exchange relation with and countercurrently to said inflowing feed stream, the method for preventing an excessive accumulation of ice in the cold part of said first and second passageways of said reversing heat exchange zone which comprises passing said outflowing hydrogen product stream leaving said reversing heat exchange zone through a second heat exchange zone in heat exchange relation with the outflowing hydrogen product stream and the waste gas product stream that are passing to the reversing heat exchange zone.

5. In a process for the indirect heat exchange of gases in three parallel passageways of a reversing heat exchange zone wherein an inflowing gaseous feed stream containing solidifiable impurities enters at a pre-expansion pressure through a reversing heat exchange zone in which said inflowing feed stream is cooled and in a cold part of which high boiling impurities are precipitated from said inflowing feed stream, a first outflowing gaseous product stream at a post-expansion pressure passes through said reversing heat exchange zone to absorb heat and scavenge said precipitated high boiling impurity by revaporization, said inflowing feed stream and first outflowing product stream being passed countercurrently and alternately with each other through first and second periodically reversing passageways in indirect exchange relation in said reversing heat exchange zone, and wherein a second outflowing gaseous product stream continuously flows through a third passageway in said reversing heat exchange zone in indirect heat exchange relation with and countercurrently to said inflowing feed stream, the method for preventing an excessive accumulation of said precipitated impurity in the cold part of said first and second passageways of said reversing heat exchange zone during several cycles of operation by restricting the temperature difference between said inflowing feed stream and said first outflowing product stream in said cold part of said reversing heat exchange zone which comprises passing said second outflowing product stream leaving said reversing heat exchange zone through a second heat exchange zone in heat exchange relation with the first outflowing gaseous product stream and the second outflowing product stream that are passing to the reversing heat exchange zone.

6. In a process for recovering hydrogen from a compressed gaseous mixture containing the same, water and hydrocarbons in a low temperature expansion and fractionating system, in which an inflowing feed stream of said compressed gaseous mixture enters said system at a pre-expansion pressure through a reversing heat exchange zone in which said inflowing feed stream is cooled and in a cold part of which water is precipitated from said inflowing feed stream to form ice, a first outflowing waste gas product stream at a post-expansion pressure passes through said reversing heat exchange zone to absorb heat and scavenge said ice by revaporization, said inflowing feed stream and outflowing waste gas product stream being passed countercurrently and alternately with each other through first and second periodically reversing passageways in indirect exchange relation in said reversing heat exchange zone, and wherein a second outflowing gaseous product stream comprising hydrogen continuously flows through a third passageway in said reversing heat exchange zone in indirect heat exchange relation with and countercurrently to said inflowing feed stream, the method for preventing an excessive accumulation of ice in the cold part of said first and second passageways of said reversing heat exchange zone during several cycles of operation by restricting the temperature difference between said inflowing feed stream and said first outflowing waste gas product stream in said cold part of said reversing heat exchange zone which comprises passing said second outflowing hydrogen product stream leaving said reversing heat exchange zone through a second heat exchange zone in heat exchange relation with the first outflowing waste gas product stream and the second outflowing hydrogen product stream that are passing to the reversing heat exchange zone.

7. In a process for the recovery of hydrogen from a compressed gaseous mixture containing the same, water, methane and heavier hydrocarbons by condensation and absorption of water and hydrocarbons in a low temperature expansion and fractionating system, in which an inflowing feed stream of said compressed gaseous mixture enters said system at a pre-expansion pressure through a reversing heat exchange zone in which said inflowing feed stream is cooled and in a cold part of which water is precipitated from said inflowing feed stream to form ice, a first outflowing waste gas product stream at a post-expansion pressure passes through said reversing heat exchange zone to absorb heat and scavenge said ice by revaporization, said inflowing feed stream and outflowing waste gas product stream being passed countercurrently and alternately with each other through first and second periodically reversing passageways in indirect exchange relation in said reversing heat exchange zone, and wherein a second outflowing product stream comprising hydrogen continuously flows through a third passageway in said reversing heat exchange zone in indirect heat exchange relation with and countercurrently to said inflowing feed stream, the method for preventing an excessive accumulation of ice in the cold part of said first and second passageways of said reversing heat exchange zone during several cycles of operation by restricting the temperature difference between said inflowing feed stream and said first outflowing waste gas product stream in the cold part of said reversing heat exchange zone which comprises passing said second outflowing hydrogen product stream leaving said reversing heat exchange zone through a second heat exchange zone in heat exchange relation with the first outflowing waste gas product stream and the second outflowing hydrogen product stream that are passing to the reversing heat exchange zone.

References Cited in the file of this patent
UNITED STATES PATENTS

| | | |
|---|---|---|
| 2,460,859 | Trumpler | Feb. 8, 1949 |
| 2,513,306 | Garbo | July 4, 1950 |
| 2,579,498 | Jenny | Dec. 25, 1951 |
| 2,715,323 | Johnson | Aug. 16, 1955 |